(12) United States Patent
Upshur et al.

(10) Patent No.: US 9,800,455 B1
(45) Date of Patent: Oct. 24, 2017

(54) LOG MONITORING SYSTEM

(75) Inventors: Raleigh H. Upshur, Seattle, WA (US); Nicholas Alexander Allen, Seattle, WA (US); Patrick J. Ward, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 214 days.

(21) Appl. No.: 13/369,086

(22) Filed: Feb. 8, 2012

(51) Int. Cl.
*G06F 15/173* (2006.01)
*H04L 29/08* (2006.01)

(52) U.S. Cl.
CPC .............................. *H04L 29/08072* (2013.01)

(58) Field of Classification Search
CPC ............. H04L 63/1408; H04L 63/1425; H04L 29/06897; H04L 41/069; H04L 41/147; H04L 47/823; H04L 67/22; H04L 43/10; G06F 21/552; G06F 21/554; G06F 21/562; G06F 2221/2101; G06F 11/3476; G06F 17/30144; G06F 17/30185; G06F 17/30368
USPC ............................................... 709/224; 726/23
See application file for complete search history.

(56) References Cited

U.S. PATENT DOCUMENTS

| | | | |
|---|---|---|---|
| 6,944,658 B1 * | 9/2005 | Schneider ......... | G06F 17/30867 709/203 |
| 7,152,242 B2 * | 12/2006 | Douglas .......................... | 726/23 |
| 7,181,768 B1 * | 2/2007 | Ghosh ................... | G06F 21/552 706/25 |
| 7,509,468 B1 * | 3/2009 | Dalal ................... | G06F 11/1458 711/152 |
| 7,512,979 B1 * | 3/2009 | Koike et al. ..................... | 726/23 |
| 8,090,816 B1 * | 1/2012 | Deshmukh et al. ........... | 709/224 |
| 8,321,910 B1 * | 11/2012 | English ............. | G06F 17/30144 726/2 |
| 8,364,811 B1 * | 1/2013 | Erdmann ............... | G06F 21/552 706/23 |
| 8,413,244 B1 * | 4/2013 | Nachenberg .......... | H04L 63/145 713/188 |
| 8,732,418 B1 * | 5/2014 | Abdulla .............. | G06F 11/1471 707/657 |
| 2003/0236992 A1 * | 12/2003 | Yami ............................ | 713/200 |
| 2004/0266533 A1 * | 12/2004 | Gentles ................... | G06F 21/32 463/42 |

(Continued)

OTHER PUBLICATIONS

Al-Hammadi, Yousof Ali Abdulla, Behavioural Correlation for Malicious Bot Detection, Oct. 20, 2010, University of Nottingham.*

*Primary Examiner* — Vivek Srivastava
*Assistant Examiner* — Muhammad Raza
(74) *Attorney, Agent, or Firm* — Thomas | Horstemeyer, LLP

(57) ABSTRACT

Disclosed are various embodiments for a log monitoring system to monitor the health of server log files. The log monitoring system may comprise at least one computing device and at least one application executable in the at least one computing device, where the at least one application being configured to generate at least one log health signal based on an analysis of the server log content generated by at least one host application. Furthermore, the application may generate a system integrity record based the at least one log health signal and an external signal, wherein the external signal embodies a system health metric of the at least one host application.

23 Claims, 4 Drawing Sheets

(56) References Cited

U.S. PATENT DOCUMENTS

| | | | |
|---|---|---|---|
| 2005/0037733 A1* | 2/2005 | Coleman | H04B 7/086 455/411 |
| 2005/0114508 A1* | 5/2005 | DeStefano | G06F 17/2705 709/224 |
| 2007/0186284 A1* | 8/2007 | McConnell | G06F 21/55 726/25 |
| 2007/0250928 A1* | 10/2007 | Boney | G06F 21/56 726/24 |
| 2008/0047016 A1* | 2/2008 | Spoonamore | G06F 21/577 726/25 |
| 2008/0059310 A1* | 3/2008 | Lettow et al. | 705/14 |
| 2008/0141332 A1* | 6/2008 | Treinen | H04L 63/1416 726/1 |
| 2009/0106838 A1* | 4/2009 | Clark | H04L 63/1408 726/23 |
| 2009/0157744 A1* | 6/2009 | McConnell | G06F 17/30241 |
| 2009/0172816 A1* | 7/2009 | Maino | G06F 21/564 726/24 |
| 2010/0030544 A1* | 2/2010 | Gopalan et al. | 703/13 |
| 2010/0031156 A1* | 2/2010 | Doyle et al. | 715/736 |
| 2010/0082513 A1* | 4/2010 | Liu | H04L 63/1458 706/46 |
| 2010/0185590 A1* | 7/2010 | D'Angelo | G06F 11/0727 707/674 |
| 2010/0268818 A1* | 10/2010 | Richmond | G06F 21/552 709/224 |
| 2011/0010633 A1* | 1/2011 | Richmond | H04L 41/12 715/736 |
| 2011/0029818 A1* | 2/2011 | Saito | G06F 11/0766 714/37 |
| 2011/0125716 A1* | 5/2011 | Drews | G06F 11/079 707/674 |
| 2011/0197279 A1* | 8/2011 | Ueoka | G06F 21/56 726/24 |
| 2012/0042125 A1* | 2/2012 | Kumar et al. | 711/118 |
| 2012/0302162 A1* | 11/2012 | Chueh | H04L 67/1095 455/39 |
| 2013/0080617 A1* | 3/2013 | Driesen | H04L 43/0876 709/224 |
| 2013/0276117 A1* | 10/2013 | Hwang | G06F 21/564 726/23 |

\* cited by examiner

LOG MONITORING SYSTEM

BACKGROUND

Application systems executed on a server may record server logs or other important records used for diagnosing application problems. Additionally, server logs or application records may be used for security operations such as preventing customer repudiation. Server logs may be subject to corruption or tampering.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Various embodiments of the present disclosure relate to maintaining the integrity of server logs or other application records created by a host application. A host application may create server logs or any other application record in the course of operation. A log monitoring system may periodically retrieve server logs and determine the health of the retrieved server log. In making this determination, the log monitoring system considers internal analyses that relate to the health of a retrieved log. For example, the log monitoring system analyzes whether the server log exists, whether an expected number of log files were retrieved, whether an expected server log format is used, whether an expected server log size is met, etc. Additionally, the log monitoring service analyzes external factors that may affect the health of the server log. For example, external factors may relate to the status of the host application, the existence of any intrusion into the host application, etc. By using various internal and external analyses in determining server log health, issues with server log corruption may be properly detected and addressed. In the following discussion, a general description of the system and its components is provided, followed by a discussion of the operation of the same.

Figure 1:
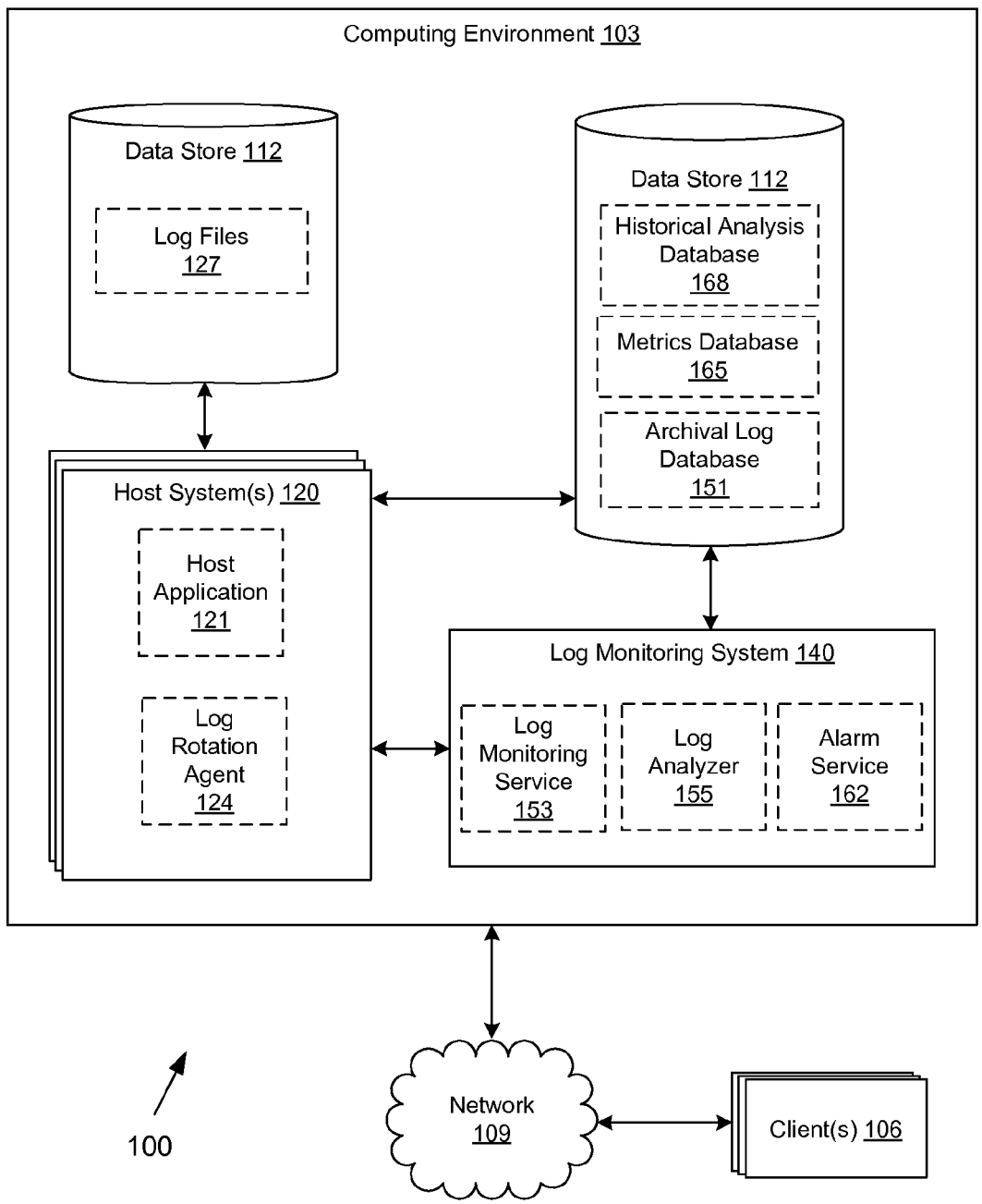
FIG. 1 is a drawing of a networked environment according to various embodiments of the present disclosure.

With reference to FIG. 1, shown is a networked environment 100 according to various embodiments. The networked environment 100 includes a network 109 in data communication with a computing environment 103 and one or more clients 106. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. The computing environment 103 may be employed, for example, in one or more server banks or computer banks or other arrangements. For example, the computing environment 103 may comprise a cloud computing resource, a grid computing resource, and/or any other distributed computing arrangement. The computing environment 103 may be located in a single installation or may be distributed among many different geographical locations. A plurality of computing devices may be employed in the various arrangements of the computing environment 103 as described above.

Various applications and/or other functionality may be executed in the computing environment 103 according to various embodiments. Also, various data is stored in a data store 112 that is accessible to the computing environment 103. The data store 112 may be representative of one or a plurality of data stores as can be appreciated. The data stored in the data store 112, for example, is associated with the operation of the various applications and/or functional entities described below.

The components executed in the computing environment 103, for example, include one or more host systems 120, a log monitoring system 140, and other applications, services, processes, systems, engines, or functionality not discussed in detail herein. Alternatively, host systems 120 may be executed as one or more instances on an individual basis. Additionally, clients 106 may communicate with host systems 120 over the network 109 and use the services of a host system 120. A host application 121 may execute one or more executable processes within the host system 120. Executable processes, for example, may facilitate providing internet or web services, data base access, etc. Furthermore, Executable processes of a host application 121 may generate one or more server logs or portions of a server log. A host system 120 also includes a log rotation agent 124 that is configured to transmit server logs to an archival log database.

Additionally, a log monitoring system 140 is executed in the computing environment 103. The log monitoring system 140 is executed in the computing environment 103 to ensure that host systems 120 produce high integrity server logs. The log monitoring system 140 includes a log monitoring service 153 that is configured to generate log health signals of server logs generated by one or more host systems 120. Additionally, the log monitoring system 140 includes a log analyzer 155 that analyzes log health signals to generate a system integrity record. The log monitoring system 140 further includes an alarm service 162 that is configured to trigger an alarm when a server log may be compromised.

The data stored in the data store 112 includes, for example, log files 127, an archival log database 151, a metrics database 165, a historical analysis database 168, and potentially other data. Log files 127 may include any server logs, application records, or any other data log that is systemically generated by one or more host applications 121 executed as part of a host system 120. The archival log database 151 is configured to durably store server logs as an archive of log files 127. The metrics database 165 is configured to record system integrity records. A historical analysis database 168 stores statistical information that corresponds to a particular server log. To this end, the historical analysis database 168 stores analyses performed on log health metrics and integrity records relating to a server log to maintain a historical record of examples of server logs that have been deemed compromised.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability.

The client 106 may be configured to execute various applications such as a browser and/or other applications. The browser may be executed in a client 106, for example, to access and render network pages, such as web pages, or other network content served up by the computing environment 103 and/or other servers. The client 106 may be configured to execute applications beyond a browser such as, for example, email applications, instant message applications, and/or other applications. A client may use the services of a host system 120 that results in the generation of server logs.

Next, a general description of the operation of the various components of the networked environment 100 is provided. To begin, the host system 120 includes a host application 121 that provides services to other systems or users. A host application 121 may include one or more executable processes that run on the host system 120. The executable processes facilitate providing the application services of the host application. Furthermore, in the course of execution, the executable processes generate server log content expressed in one or more log files 127.

Executable processes log important information relating to the execution of the host application 121. For example, a server log may reflect a list of errors resulting from operation. Additionally, other records may be kept that assist in the diagnosis of problems encountered by the host system 120. Server logs may also be generated to assist product developers in evaluating the performance of a host system at a later point in time. Client requests made to the host system 120 may also be recorded as server log content.

A log file 127 may reflect log access attempts, application status messages, audit information, or other records regarding the operation of the host system 120. The log file 127 may be organized as multiple log files, such as a separate access log, audit log, and application log. The log files 127 may be further separated according to other system factors, for example, to provide a separate set of log files for each hour of the day or to provide a separate set of log files for each server process. Thus it may be appreciated that complex and/or comprehensive server log content may comprise hundreds or even thousands of new log files added each day.

Log files 127 are generated by host systems 120. One or more host systems 120 may be executed simultaneously across multiple computing devices in different geographic locations such that each host system 120 is generating server log content to be stored as one or more log files 127. For example, the host services provided to a client 106 may be served by multiple host systems 120 executed in parallel. Thus, log files 127 are generated in real time as host systems 120 continue with operation.

A host system 120 includes a log rotation agent 124 that is configured to scan a host system 120 for detecting log files 127. The log rotation agent 124 may transmit the detected log files 127 to an archival log database 151. In one embodiment, the log rotation agent 124 is configured to operate on a periodic basis for scanning the host system 120 for new log files 127. For example, the log rotation agent 124 may schedule a recurring Cron job, or any other job using a time-based job scheduler, to scan the contents of a log file directory every hour. The periodic process of scanning for log files 127, retrieving log files 127 and storing log files 127 in an archival log database 151 may be performed by a user-defined time interval that is pre-determined. That is to say, a user may specify the operation cycle in which the log rotation agent 124 stores detected log files 127 in an archival log database 151. In an alternate embodiment, the log rotation agent 124 randomizes the periodic basis for scanning the host system 120 for new log files to desynchronize execution of the log rotation agent 124 among the host systems 120. Ultimately, the log rotation agent 124 retrieves log files 127 and transmits the log files 127 to an archival log database 151 for storage. Thus, log files 127 are copied and stored in the archival log database 151.

As host systems 120 grow in complexity, it may become difficult to ensure that server log content is completely and correctly maintained. Lacking a strong assurance of correct operation, the integrity of the server log may, over time, be compromised by either inadvertent errors or deliberate acts. Various embodiments of the present disclosure describe a log monitoring system 140 that addresses these issues.

Figure 2:
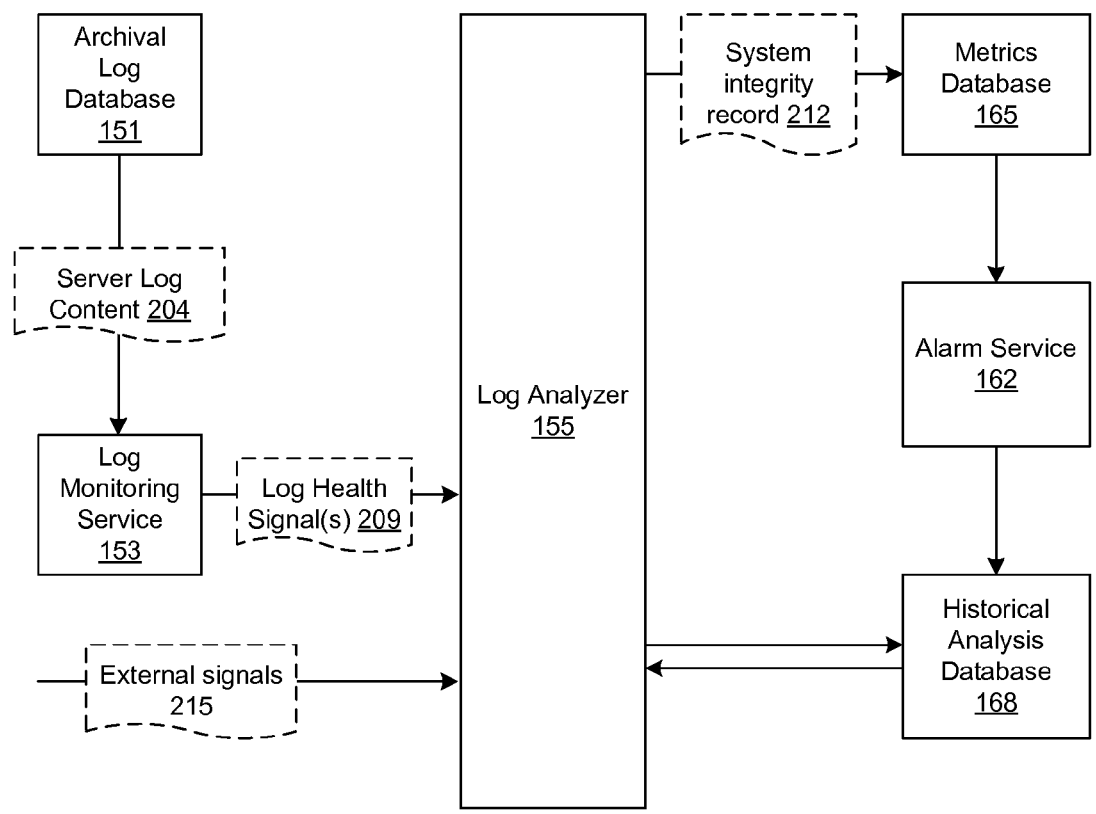
FIG. 2 is a drawing of an example of the operation of the log monitoring system executed in a computing environment in the networked environment of FIG. 1 according to various embodiments of the present disclosure.

Referring next to FIG. 2, shown is an example of the operation of the log monitoring system 140 executed in the networked environment 100 of FIG. 1 according to various embodiments of the present disclosure. Specifically, FIG. 2 depicts the handling of server log content 204. A log analyzer 155 may receive log health signals 209 that characterize the health of particular server log content 204. A log analyzer 155 may analyze the log health signals 209 as well as external signals 215 to generate a system integrity record 212.

To begin, an archival log database 151 includes server log content 204 stored as one or more log files 127 (FIG. 1) that were transmitted by a log rotation agent 124 (FIG. 1). The archival log database 151 may be organized as a file system, relational database, data warehouse, or other scheme for storing log files 127 that include server log content 204. Server log content 204 is systematically generated by host systems 120 (FIG. 1) as host systems 120 are operating. Server log content 204 may include a corresponding time stamp reflecting the time of creation. In various embodiments, components of the log monitoring system 140 process the server log content 204 within minutes, hours, or days after the generation of the server log content 204. Thus, the timing of the generation of the server log content 204 should be maintained.

In some embodiments the archival log database 151 may be partitioned into several data stores. For example, the archival log database 151 may be partitioned by application to isolate storage of the log files 127. As another example, the archival log database 151 may be partitioned by time to store a portion of the log files 127 in a cold storage area that may trade access time for cheaper operation of the storage.

A log monitoring service 153 is configured to examine the server log content 204 stored in the archival log database 151. Specifically, the log monitoring service 153 is in communication with the archival log database 151 to retrieve server log content 204. Communication with the archival log database 151 may take place using, for example, a network transport such as HTTP, HTTPS, or any message queue over a network 109 (FIG. 1). In some embodiments, communication with the archival log database 151 may be facilitated by bundling multiple log files 127 into an archive for more efficient transmission as a single communication.

Once the log monitoring service 153 obtains server log content, the log monitoring service 153 examines the server log content 204 for analysis. In this analysis process, the log monitoring service 153 analyzes the server log content 204 with respect to one or more internal characteristics of the server log content. Internal characteristics of the server log content 204 regard the intrinsic properties of one or more log files 127 that express server log content 204. For example, the internal characteristics of server log content 204 may be the size of the server log content 204, the number of log files 127 used to store the server log content 204, the data format of the server log content 204, the structure of the server log content 204, the number of errors in the server log content 204, whether the server log content 204 exists, the number of lines in a log file 127 matching a particular pattern or regular expression, the creation time of a log file 127, the last modification time of a log file 127 or any other intrinsic characteristic of the log files 127.

In one example, an internal characteristic of the server log content 204 is the size of the server log content 204. The log monitoring service 153 obtains the size of one or more log files 127 retrieved from the archival log database 151 and compares the size to an expected size. In one embodiment, the log monitoring service 153 communicates with the host systems 120 that generated the server log content 204 to obtain an expected size. For example, the log monitoring service 153 queries a configuration database, where the configuration database monitors and tracks the status of one or more host systems 120. Accordingly, the configuration database stores information about server log content that host systems 120 generate in real time. In another embodiment, the log monitoring service 153 obtains a network traffic prediction to determine an expected size of the server log content 204. In this case, an expected number of bytes generated as server log content 204 per user is multiplied by a number of users accessing the host systems 120 for a period of time. This results in an expected size of server log content 204 for a given period of time. In yet another embodiment, the expected size of a log file 127 can be determined by analyzing the actual size of recently retrieved log files 127. The expected size of a log file 127 may be a size range.

In generating a log health signal 209, the log monitoring service 153 may also apply historical analysis with respect to the size of a log file 127 to calculate whether the size is within a defined deviation from past log file sizes. As another example, the log monitoring service 153 may calculate whether the rate of change of the size of a log file 127 is within a threshold for determining spikes or dips in the log file size. Also, the log monitoring service 153 may calculate whether the size of a log file falls within expected seasonal variations, such as to account for evening, weekend, or holiday traffic. The log monitoring service 153 generates a log health signal accordingly.

In another example, the internal characteristic of the server log content 204 is a number of log files 127. Server log content 204 may be stored in any number of files in an archival log database 151. As log files 127 are generated and eventually stored in the archival log database 151, the number of log files should not change under normal operation. Again, the log monitoring service 153 may communicate with one or more host systems 120 to determine an expected number of log files that should exist.

In another example, the internal characteristic of the server log content 204 is the data format of the server log content 204. For example, a format of server log content 204 may be text based, binary, or any other format. The internal characteristics may also be the data structure of the server log. For example, server log content 204 may be expressed in a repetitive structure systematically separated by particular characters or lines. The log monitoring service 153 parses the server log content 204 to analyze the file format and/or structure. Also, another internal characteristic may be the fact of whether a log file exists.

As seen above, various internal characteristics of server log content 204 exist. Once the log monitoring service 153 retrieves one or more log files 127 for analyzing the server log content 204 contained within one or more log files 127, the log monitoring service 153 generates one or more log health signals 209 based on the analysis of the intrinsic characteristics. In one embodiment, the log monitoring service 153 generates a log health signal 209 for each internal characteristic. For example, if the log monitoring service 153 analyzes the log file size and the log format, then the log monitoring service 153 may generate a log health signal 209 representing an analysis of the log file size and a separate log health signal 209 representing an analysis of the log format. Alternatively, the log monitoring service 153 may generate one log health signal 209 that represents an analysis of a plurality of internal characteristics.

In one embodiment, the log monitoring service 153 generates a binary signal that indicates whether an issue exists with respect to a particular internal characteristic. For example, if the log monitoring service 153 determines that the size of the server log content 204 is not similar to an expected size, the log monitoring service 153 may produce a log health signal 209 indicating this result. As another example, the log monitoring service 153 checks whether a retrieved number of log files 127 matches an expected number of log files. If a discrepancy exists, then a corresponding log health signal 209 is generated. Thus, the log monitoring service 153 generates one or more log health signals 209 based on an analysis of one or more internal characteristics of a retrieved log file 127. These log health signals 209 are then transmitted to a log analyzer 155.

The log monitoring service 153 may be configured to periodically retrieve a collection of log files 127 stored in an archival log database 151. For example, the log monitoring service 153 may schedule a recurring Cron job, or any other job using a time-based job scheduler, to retrieve any log files 127 written to the archival log database 151 by the executable processes in the previous hour. In one embodiment the log monitoring service 153 is configured with a time offset to account for eventual consistency of the archival log database 151. For example, the archival log database 151 may indicate that written log files 127 will appear within 2 hours of being written. In response, the log monitoring service 154 may be configured to retrieve log files 127 written to the archival log database 151 using a time offset that exceeds 2 hours to ensure that the log files 127 will exist prior to retrieval by the log monitoring service 153. Thus, server log content 204, from the time of generation, moves along a pipeline according to a predefined cycle.

In one embodiment, while the log monitoring service 153 periodically retrieves server log content 204, additional log files 127 may be concurrently generated and subsequently transmitted to the archival log database 151. Accordingly, as the log monitoring service 153 performs a periodic retrieval, the log monitoring service 153 may be configured to retrieve all server log content 204 generated from the point in time of the last retrieval up until the current point in time or some other stopping point in time. Thus, in this embodiment, the log monitoring service 153 may be configured to retrieve the server log content 204 at varying intervals of time. Specifically, the log monitoring service 153 may use time stamp information associated with the server log content 204 to track the point in time of the last retrieval to ensure that all server log content 204 is eventually retrieved. To this end, the log monitoring service 153 decouples the retrieval of server log content 204 from any systematic storage of log files 127 in the archival log database 151.

For example, if log files 127 are stored in the archival log database 151 once every three hours, the log monitoring service 153 may retrieve server log content 204 from the archival log database 151 at points in time that are not synchronized to the periodic three hour storage. In other words, through the use of time stamps, the log monitoring service 151 decouples the way in which log files 127 are written from the way log files 127 are read.

In various embodiments, the log monitoring service 153 is configured to handle instances when the storage of log files 127 in the archival log database 151 results from an unexpected delay. This situation, which is referred to as backfilling, may be problematic when the log monitoring service 153 retrieves server log content 204 at varying intervals of time according to time stamps of previous retrievals. For example, the log monitoring service 153 performs a retrieval from the point in time of the last retrieval to the current point in time. In this example, the point in time of the last retrieval may be 9:21 PM and the current point in time may be 10:30 PM. Thus, the log monitoring service 153 retrieves all server log content 204 from the archival log database 151 with time stamps between 9:21 PM and 10:30 PM. Accordingly, the log monitoring service 153 records a point in time of last retrieval as 10:30 PM. Now assuming, in this example, that some unexpected delay in the system caused a log file 127 to be stored in the archival log database 151 with a time stamp of 9:15 PM. To counter this backfilling problem, the log monitoring service 153 may be configured to check whether log files 127 have been retrieved from the archival log database and then retrieve all unretrieved log files 127. In this example, assuming it is now 11:26 PM, the log monitoring service 153 may retrieve all log files 127 with time stamps between 10:30 PM and 11:26 PM as well as any log files 127 that have not been retrieved prior to 10:30 PM. Furthermore, the log monitoring service 153 may be configured to generate recalculated log health signals 209 based on analyzing any server log content 204 that was unexpectedly delayed.

Next, a log analyzer 155 may analyze received log health signals 209 to determine whether to transmit a system integrity record 212 to a metrics database 165. In one embodiment, the log analyzer 155 executes an algorithmic process mapping a vector of received log health signals 209 to a Boolean determination of whether to transmit a system integrity record 212. That is to say, the log analyzer 155 analyzes one or more received log health signals 209 to determine whether to generate a system integrity record 212. For example, abstaining from generating a system integrity record 212 indicates an integrity issue or error with the currently retrieved server log content 204. To this end, the system integrity record 212 indicates whether a server log content error exists based on an analysis of the log health signals 209 and/or external signals 215. Thus, in this example, the system integrity record 212 is a heartbeat signal that is periodically generated for each periodic retrieval of server log content 204. Furthermore, the heartbeat signal is a binary signal that indicates either an absence or presence of a log integrity issue or error relating to currently retrieved server log content 204. In alternate embodiments, the system integrity record 212 is a signal that includes various factors that characterize the health of particular server log content 204. For example, rather than being a binary signal, the system integrity record 212 encodes the log health signals 209 along with any corresponding external signals.

In one example, the log analyzer 155 receives log health signals 209 that indicate issues with a number of internal characteristics of server log content 204 retrieved for a particular point in time. The log health signals 209 may indicate that the particular server log content 204 has an expected file size, file format, file structure, and expected number of files. Accordingly, the log analyzer 155 may generate a system integrity record 212 indicating that the particular server log content 204 does not have log integrity issues or errors.

In a similar example, the log health signals 209 may indicate that the currently retrieved server log content 204 has an expected number of files, expected file format, and an expected file structure. However, the log health signal 209 indicates that the currently retrieved server log content 204 does not have an expected file size. In this case, the log analyzer 155 may still generate a system integrity record 212 indicating that the currently retrieved server log content 204 has no log integrity issues or errors because only a minority of log health signals 209 indicates a potential issue. The majority of log health signals 209, on the other hand, indicate that the server log content 204 meets expectations. That is to say, a mismatch of expected file size and actual file alone may not warrant a log error.

In one embodiment, the log analyzer 155 weights each received log health signal 209 when determining whether to generate a system integrity record 212. For example, the log analyzer 155 may be configured to deem issues with file structure as important. When a log monitoring service 153 determines that the file structure of a retrieved log does not meet an expected file structure, a corresponding log health signal 209 is generated. This corresponding log health signal may be given extra weight by a log analyzer 155 when determining whether to generate a system integrity record 212. So, even if the log health signals 209 indicate that all other internal characteristics of server log content 204 meet expectations, the log analyzer 155 may abstain from generating a system integrity record 212.

In alternate embodiments, the presence of a system integrity record 212 indicates an integrity issue with a currently retrieved log while the absence of a system integrity record 212 indicates no integrity issue.

In generating the system integrity record 212, the log analyzer 155 may also apply historical analysis to a log health signal 209 for the size of a log file 127 to calculate whether the size is within a defined deviation from past log file sizes. As another example, the log analyzer 155 may calculate whether the rate of change of the size of a log file 127 is within a threshold for determining spikes or dips in the log file size. Also, the log analyzer 155 may calculate whether the size of a log file falls within expected seasonal variations, such as to account for evening, weekend, or holiday traffic.

In addition to analyzing log health signals 209 to determine whether to transmit a system integrity record 212, the log analyzer 155 may also analyze external signals 215. An external signal 215, for example, may be any signal that indicates the health of the host system 120. Moreover, external signals 215 may represent any issues relating to the computing environment 103 (FIG. 1). While internal characteristics address the inherent nature of server log content 204, external signals 215 reflect the environment in which the server log content 204 was generated. Problems in the host system 120 may result in generating corrupt server log content 204. Additionally, external signals 215 may be received from an infrastructure database that determines an expected number of host systems 120 that should be transmitting log files 127. In various embodiments, an external signal 215 may be any input received from a historical analysis database 168, which is discussed in greater detail below.

In one example, an external signal 215 may relate to whether intrusion is detected on the host system 120. For example, intrusion detection and prevention systems may be executed concurrently along with host applications 121 (FIG. 1). When an actual or potential intrusion is identified, an external signal may be sent to the log analyzer 155 in response. Then, the log analyzer 155 considers the fact of potential or actual intrusion when determining whether to generate a system integrity record 212.

In another example, external signals 215 may be generated by the host system 120 when the host system 120 encounters operational errors. Alternatively, any other system that monitors the operational status of the host system 120 may generate external signals 215 to inform the log analyzer 155.

Accordingly, the log analyzer 155 applies the information contained within an external signal 215 for making a determination of whether to transmit a system integrity record 212. In doing so, the log analyzer 155 is configured to account for the timing between the origination of the external signal 215 and the generation of the server log content 204. The log analyzer 155 analyzes log health signals 209 relating to a server log content 204 that is not necessarily recent, as the log rotation agent 124 may be programmed to delay the transmission of log files 127 to the archival log database 151. On the other hand, the event that triggered the external signal (e.g., intrusion detection, host system errors, other computing environment errors, etc.) includes a time stamp reflecting the time of the event, which may be real time. Thus, the log analyzer 155 is configured to match the time stamp of the server log content 204 and any corresponding log health signals 209 to the time stamp of any external signals. Furthermore, the log analyzer 155 may be configured to recalculate a system integrity record 212 when a delayed log file 127 is retrieved as a result of the backfilling problem. In this case, the log analyzer 155 uses the time stamp of the log file 127 with the delayed retrieval to generate the system integrity record.

The log analyzer 155 may transmit the system integrity record 212 to a metrics database 165 that stores system integrity records 212. For example, system integrity records 212 may be stored sequentially in chronological order.

In various embodiments, an alarm service 162 is configured to examine the metrics database 165 for analyzing the history of system integrity records 212. If system integrity records 212 are configured to be a binary result, the alarm service 162 checks to see whether there is an absence of a system integrity record 212, where an absence or a presence indicates an integrity issue or error with particular server log content 204.

In various embodiments, an alarm service 162 examines the metrics database 165 for system integrity records 212 and, based on the absence of a system integrity record 212, the alarm service may fire an alarm. The alarm service may fire an alarm by, for example, transmitting a notification message to a consumer subscribed to a message queue or notification service.

In one embodiment the alarm service 162 looks for multiple missed integrity records before firing an alarm. For example, the alarm service 162 may check whether a threshold number of consecutive system integrity records 212 are absent. If the threshold number is 2, then 3 or more consecutive system integrity records 212 that are absent may cause the triggering of an alarm. In another example, the alarm service 162 checks whether a percent of absent integrity records exceeds a threshold percent. So, for example, if the last 3 of 5 integrity records are absent, then an alarm may be triggered. Requiring multiple confirmation of an integrity issue may provide operational benefit such as reducing the occurrence of false alarms.

In various embodiments, the log monitoring system 140 includes a historical analysis database 168 that stores instances of alarm decisions. The alarm service 162 may publish a record of an alarm decision to the historical analysis database 168. The historical analysis database 168 may contain records correlating a past instance of received log health signals 209 to a past decision of whether to transmit a system integrity record 212 was correct. For example, the historical analysis database 168 may record a past instance of received log health signals 209 that led to an alarm being fired along with a determination of whether the fired alarm was a false alarm or a true alarm.

Accordingly, the historical analysis database 168 may, for example, be used as a feedback process to tune the analysis of the log health signals 209 by the log analyzer 155 based on past alarm outcomes. The log analyzer 155 may base the determination of whether to transmit a system integrity record 212, at least in part, on a contained record in the historical analysis database 168. In one embodiment, the log analyzer 155 uses a naïve Bayes classifier to assist the log analyzer 155 in determining whether to transmit a system integrity record 212. The log analyzer 155 uses the contained record to calculate a probability model for the naïve Bayes classifier. Thus, the log analyzer 155 may consult a historical analysis database 168 to calculate statistical information based on received log health signals 209.

Figure 3:
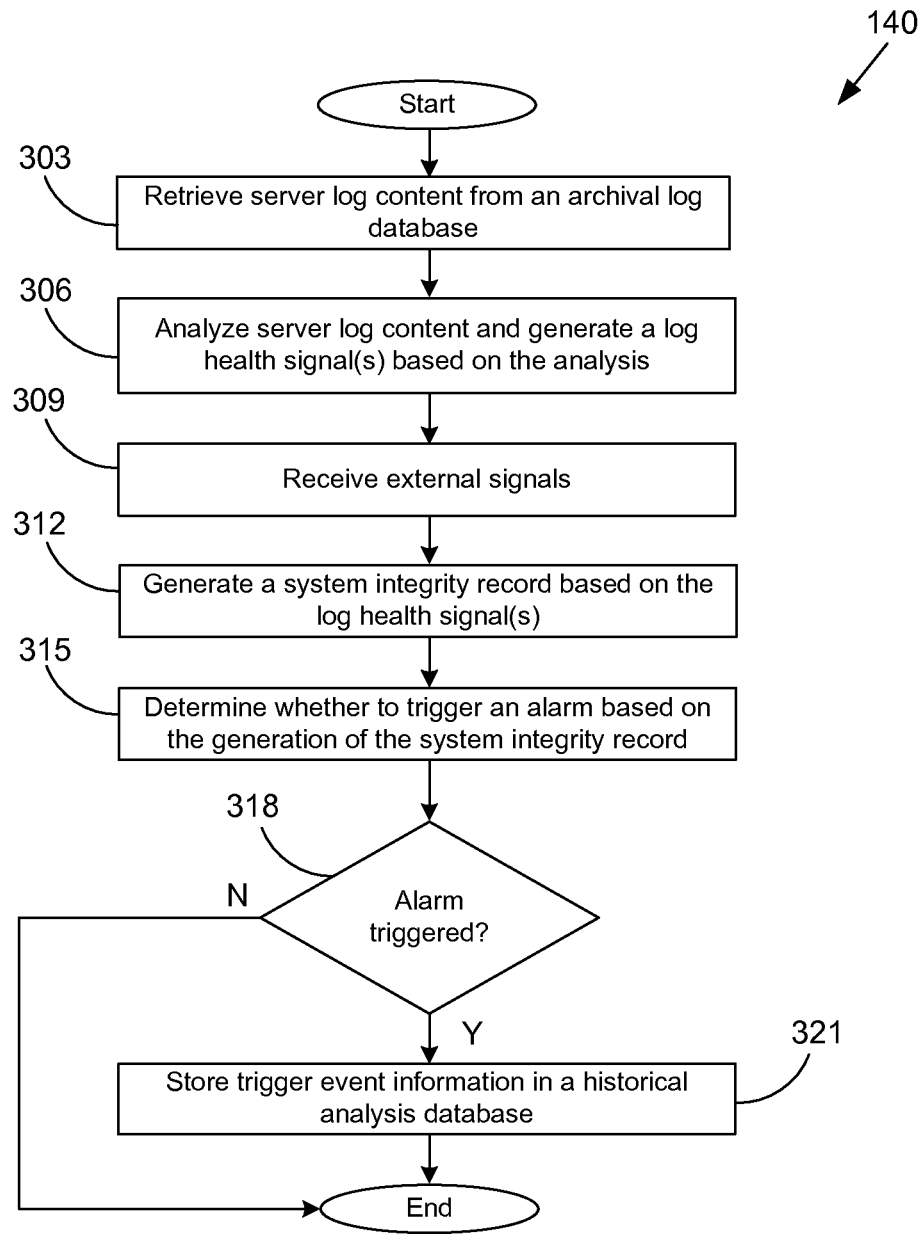
FIG. 3 is a flowchart illustrating one example of functionality implemented as portions of the log monitoring system executed in a computing environment in the networked environment of FIG. 1 according to various embodiments of the present disclosure.

Referring next to FIG. 3, shown is a flowchart that provides one example of the operation of a portion of the log monitoring system 140 according to various embodiments. It is understood that the flowchart of FIG. 3 provides merely an example of the many different types of functional arrangements that may be employed to implement the operation of the portion of the log monitoring system 140 as described herein. As an alternative, the flowchart of FIG. 3 may be viewed as depicting an example of steps of a method implemented in the computing environment 103 (FIG. 1) according to one or more embodiments.

Beginning with box 303, the log monitoring system 140 retrieves server log content from an archival log database 151 (FIG. 1). For example, the log monitoring system 140 may be programmed to periodically retrieve server log content 204 (FIG. 2) according to a predetermined retrieval cycle, such as, for example, once an hour.

In box 306, the log monitoring system 140 analyzes the server log content 204 and generates one or more log health signals 209 (FIG. 2) based on the analysis. In one example, each log health signal 209 corresponds to an analysis of a respective internal characteristic of the server log content 204. Accordingly, there may be log health signals 209 that correspond to a log file size analysis, a log format analysis, a log structure analysis, etc.

In box 309, the log monitoring system 140 receives external signals that reflect the status, health, or history of the host systems 120 (FIG. 1) or computing environment 103. In one embodiment, the log analyzer 155 receives the external signals 215 (FIG. 2) and analyzes them with respect to any server log content 204 that was generated at the time the external signal 215 was generated.

In box 312, the log monitoring system 140 generates a system integrity record 212 (FIG. 2) based on the one or more log health signals 209. Additionally, the log monitoring system 140 may base its determination on any received external signals 215. The system integrity records may reflect a complete analysis of the log health signals 209 and any corresponding external signals 215. In various embodiments, the generation of a system integrity record 212 is a binary result where the absence of generating a system integrity record 212 symbolizes a determination of a log integrity issue or error for particular server log content.

In box 315, the log monitoring system 140 determines whether to trigger an alarm based on the generation of the system integrity record 212. Depending on the number of absent or present system integrity records, an alarm may be triggered. For example, three consecutive absent system integrity records 212 may result in the triggering of an alarm.

In box 318, if an alarm is not triggered, then the operation of the portion of the log monitoring system 140 described above ends. However, if the alarm is triggered, then, in box 321, the log monitoring system 140 stores trigger event information in a historical analysis database 168 (FIG. 1). Thus, the historical analysis database 168 may include a list of contained records where alarms were triggered along with a corresponding analysis that led to the determination of triggering the alarm. The log monitoring system 140 may use this historical analysis database 168 to make subsequent analyses regarding retrieved server log content 204.

Figure 4:
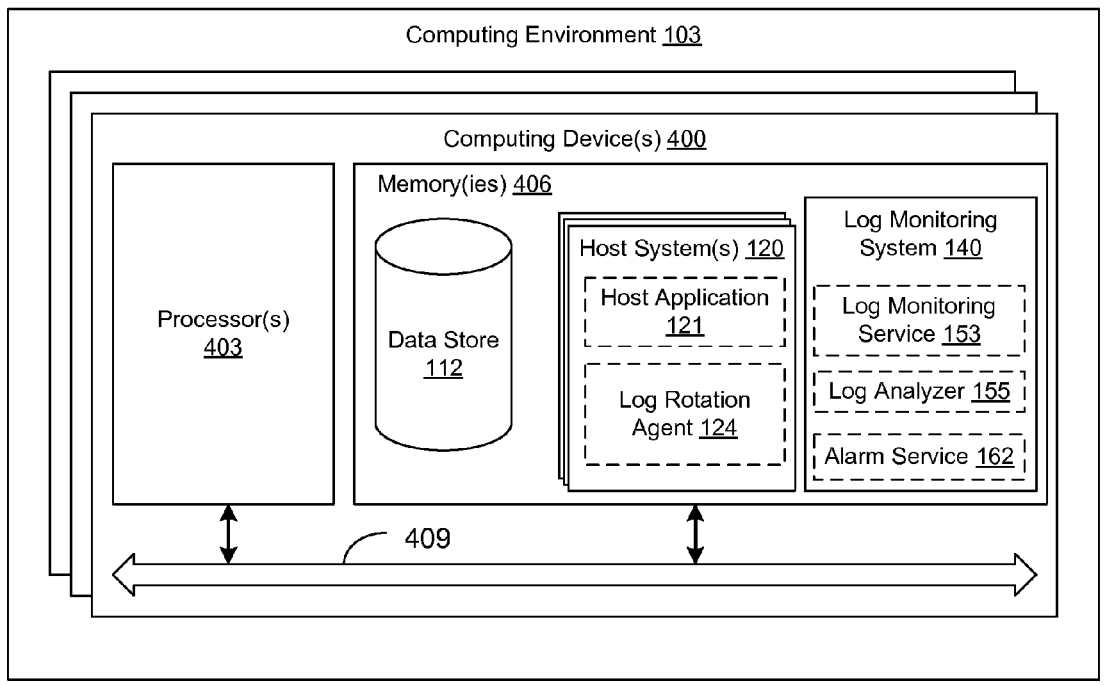
FIG. 4 is a schematic block diagram that provides one example illustration of a computing environment employed in the networked environment of FIG. 1 according to various embodiments of the present disclosure.

With reference to FIG. 4, shown is a schematic block diagram of a computing device 400 which may be employed in the computing environment 103 according to an embodiment of the present disclosure. The computing device 400 may also correspond, for example, to a client 106 (FIG. 1). The computing device 400 includes at least one processor circuit, for example, having a processor 403 and a memory 406, both of which are coupled to a local interface 409. To this end, the computing device 400 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are host systems 120, log monitoring systems 140, and potentially other applications. Also stored in the memory 406 may be a data store 112 and other data. In addition, an operating system may be stored in the memory 406 and executable by the processor 403.

It is understood that there may be other applications that are stored in the memory 406 and are executable by the processors 403 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network 109 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although host systems 120, the log monitoring system 140, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 3 shows the functionality and operation of an implementation of portions of the log monitoring system 140. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including host systems 120, the log monitoring system 140, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium having a plurality of computer instructions executable by at least one computing device, wherein, upon execution, the plurality of computer instructions cause the at least one computing device to:
   periodically retrieve server log content from an archival log database, wherein the server log content comprises a plurality of log files generated by at least one host application;
   generate a first log health signal based at least in part on whether the server log content is within a defined deviation of an expected server log data size, wherein the expected server log data size is determined at least in part as a function of a network traffic prediction, the network traffic prediction being determined at least in part by an expected quantity of data associated with the server log content per user multiplied by a quantity of users accessing the at least one host application within a time period;
   generate a second log health signal based at least in part on whether the server log content meets an expected number of log files expressed in the server log content;
   generate a third log health signal based at least in part on whether the server log content meets an expected server log format, wherein the expected server log format comprises a defined file format;
   facilitate receiving at least one external signal relating to the at least one host application and a first timestamp corresponding to a time of origination of the at least one external signal, wherein the at least one external signal comprises an indication of an operational error detected during an execution of the at least one host application;
   determine at least one log file of the server log content associated with the at least one external signal by matching the first timestamp to a second timestamp associated with a time of creation of the at least one log file of the server log content;
   determine that a server log content error exists based at least in part on the first log health signal, the second log health signal, the third log health signal, the at least one log file of the server log content, and the at least one external signal; and
   transmit a system integrity record to an alarm service for generating an alarm according to the server log content error.

2. The non-transitory computer-readable medium of claim 1, wherein periodically retrieving the server log content further comprises periodically retrieving the server log content at a predetermined interval of time.

3. The non-transitory computer-readable medium of claim 1, wherein the server log content is generated for providing evidence of tampering in relation to the at least one host application.

4. The non-transitory computer-readable medium of claim 1, wherein individual ones of the plurality of log files comprise a record of a plurality of operations executed in association with the at least one host application.

5. A system, comprising:
   at least one computing device comprising a memory and a processor; and
   at least one application executable in the at least one computing device, the at least one application causing the at least one computing device to at least:
      periodically retrieve server log content from an archival log database;

generate a first log health signal, a second log health signal, and a third log health signal based at least in part on an integrity analysis of the server log content, wherein the server log content comprises a plurality of server log files generated by at least one host application, wherein the integrity analysis is configured to indicate a presence of at least one sign of log tampering or corruption for the plurality of server log files, wherein the integrity analysis generates the first log health signal based at least in part on analyzing whether the server log content is within a predefined threshold of an expected server log content data size, wherein the expected server log content data size is determined as a function of a network traffic prediction, the network traffic prediction being determined by an expected quantity of data associated with the server log content per user multiplied by a quantity of users accessing the at least one host application within a time period, wherein the integrity analysis generates the second log health signal based at least in part on determining whether the server log content meets an expected number of log files in the server log content, wherein the integrity analysis generates the third log health signal based at least in part on determining whether the server log content meets an expected server log format, wherein the expected server log format comprises a defined file format;

facilitate receiving at least one external signal relating to the at least one host application and a first timestamp corresponding to a time of origination of the at least one external signal, wherein the at least one external signal comprises an indication of an operational error detected during an execution of the at least one host application;

determine that at least one server log file of the server log content is associated with the at least one external signal by matching the first timestamp to a second timestamp associated with a time of creation of the at least one server log file of the server log content;

generate a system integrity record based at least in part on the integrity analysis of the first log health signal, the second log health signal, the third health log signal, the at least one server log file of the server log content, and the at least one external signal, wherein the system integrity record is a periodic signal that indicates either an absence or a presence of an error relating to the server log content; and transmit the system integrity record to an alarm service for generating an alarm according to the error relating to the server log content.

6. The system of claim 5, wherein the at least one application further causes the at least one computing device to query the at least one host application to determine the expected number of log files.

7. The system of claim 5, wherein the at least one application further causes the at least one computing device to parse the server log content.

8. The system of claim 5, wherein the at least one external signal further comprises a determination made by an intrusion detection system.

9. The system of claim 5, wherein the at least one application further causes the at least one computing device to initiate an alarm triggering event if the system integrity record indicates the error in relation to the server log content.

10. The system of claim 5, wherein the at least one application further causes the at least one computing device to store a historical analysis comprising the system integrity record and a corresponding analysis of a determination of the system integrity record.

11. The system of claim 10, wherein generating the at least one log health signal is further based at least in part on the historical analysis for facilitating a feedback process for generating subsequent system integrity records.

12. The system of claim 5, wherein the integrity analysis includes a determination of whether an actual data size of the at least one server log file is within a calculated deviation of a plurality of past server log files.

13. A method, comprising:

periodically retrieving, in at least one computing device, server log content from an archival log database, wherein the server log content includes a plurality of log files;

periodically receiving, in the at least one computing device, a first log health signal, a second log health signal, and a third log health signal associated with server log content, wherein the server log content is generated by at least one host application, and wherein the first log health signal is based at least in part on whether the server log content meets an expected server log content data size, wherein the expected server log content data size is determined as a function of a network traffic prediction, the network traffic prediction being determined at least in part by an expected quantity of data associated with the server log content per user multiplied by a quantity of users accessing the at least one host application within a time period, wherein the second log health signal is based at least in part on whether the server log content meets an expected number of log files expressed in the server log content, wherein the third log health signal is based at least in part on whether the server log content meets an expected server log format, wherein the expected server log format comprises a defined file format;

receiving, in the at least one computing device, at least one external signal relating to the at least one host application and a first timestamp corresponding to a time of origination of the at least one external signal, wherein the at least one external signal comprises an indication of an operational error detected during an execution of the at least one host application;

determining, in the at least one computing device, at least one log file of the server log content associated with the at least one external signal by matching the first timestamp to a second timestamp associated with a time of creation of the at least one log file of the server log content;

generating, in the at least one computing device, a system integrity record based at least in part on the first log health signal, the second log health signal, the third log health, the at least one log file of the server log content, and the at least one external signal; and transmitting, via the at least one computing device, the system integrity record to an alarm service for generating an alarm according to an error relating to the server log content.

14. The method of claim 13, wherein generating the alarm in response to the system integrity record indicating an error in a threshold number of a plurality of consecutive system integrity records.

15. The method of claim 13, further comprising storing, in a memory accessible to the at least one computing device, a historical analysis comprising the system integrity record and a corresponding analysis of a determination of the system integrity record.

16. The method of claim 15, wherein the at least one external signal is further based at least in part on the historical analysis for facilitating a feedback process for generating subsequent system integrity records.

17. The method of claim 13, further comprising periodically analyzing, in the at least one computing device, according to a predetermined interval of time, the server log content to generate at least one of the first log health signal, the second log health signal, or the third log health signal.

18. The method of claim 17, wherein the predetermined interval of time is a first predetermined interval of time, and wherein the method further comprises periodically storing, in a memory accessible to the at least one computing device, the server log content according to a second predetermined interval of time, wherein the second predetermined interval of time varies from the first predetermined interval of time.

19. The method of claim 13, further comprising:
retrieving, in the at least one computing device, the server log content according to varying intervals of time; and
storing, in a memory accessible to the at least one computing device, a third time stamp of a previous retrieval of server log content.

20. The method of claim 13, wherein generating the system integrity record further comprises recalculating the system integrity record based at least in part on a delayed log file retrieved in response to a log backfilling occurrence.

21. The method of claim 13, wherein the server log content is generated for providing evidence of tampering in relation to the at least one host application.

22. The method of claim 13, further comprising storing, in a memory accessible to the at least one computing device, the server log content.

23. The method of claim 13, further comprising initiating, in the at least one computing device, an alarm triggering event in response to the system integrity record indicating a percent of a plurality of absent integrity records exceeding a threshold percentage.

* * * * *